UNITED STATES PATENT OFFICE.

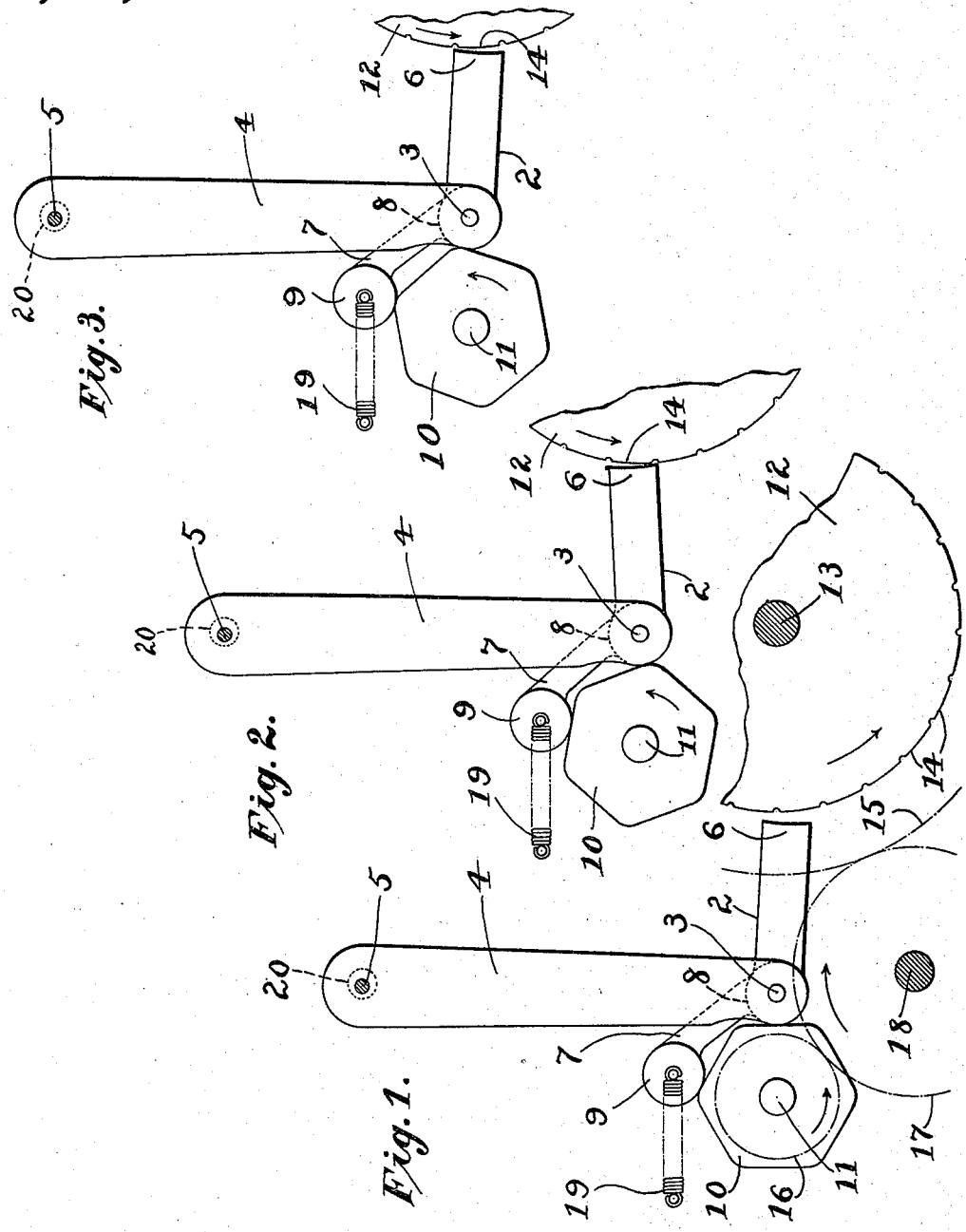

FRANK DE MINICO, OF NEW YORK, N. Y., ASSIGNOR TO POLLARD-ALLING MANUFACTURING COMPANY, OF NEW YORK, N. Y., A CORPORATION OF NEW YORK.

MECHANICAL MOVEMENT.

1,145,233.      Specification of Letters Patent.      Patented July 6, 1915.

Application filed March 5, 1914, Serial No. 822,642. Renewed May 24, 1915. Serial No. 30,214.

*To all whom it may concern:*

Be it known that I, FRANK DE MINICO, a citizen of the United States, and a resident of New York, Bronx borough, in the county of Bronx and State of New York, have invented certain new and useful Improvements in Mechanical Movements, of which the following is a specification.

This invention relates to mechanical movements and is particularly directed to that class thereof in which an oscillating and reciprocating member is caused to coact with the periphery of a rotating member.

The object of my improvements is to provide a device of the class specified, simple in construction and efficient in operation.

In the drawings accompanying this specification, I have illustrated in diagrammatic form the preferred embodiment of my improvements and therein—

Figure 1 is a side elevation of a mechanism embodying my improvements. Figs. 2 and 3 are similar views, with some parts omitted, illustrating successive steps in the operation of my mechanical movement.

Before describing the invention in detail I desire to have it understood that the invention is not limited to the particular construction and arrangement of parts which I have illustrated and shall hereinafter describe, and that various changes may be made in the mechanism shown without departing from the spirit or scope of the invention, and that the phraseology which I employ is for the purpose of description and not of limitation.

The principal member of my improved device is movable member 2, mounted for reciprocation and oscillation. Said member 2 may be conveniently pivoted at 3 to the free end of oscillatable arm 4 pivoted at 5 to some fixed portion of a supporting member, not shown. Said movable member 2 preferably comprises an outreaching portion 6 and an upwardly reaching arm 7. Said movable member is provided with two cam rolls, 8 and 9, the former of which may be pivoted co-axially with pin 3 on which said member turns and the other of which is pivoted on arm 7. Said cam rolls are for engagement with cam 10 pivotally mounted on shaft 11 fixed in the supporting frame, not shown. To the right of said cam 10 and movable member 2, is rotatable member 12, pivotally mounted on shaft 13. Said rotatable member 12 preferably has its periphery evenly divided into segments, 14, 14.

Fixed to rotatable member 12 is a gear, whose pitch line is indicated by dot and dash line 15. Fixed to cam 10 is gear 16. Intermediate gear 17 is rotatably mounted on stud 18 for transmitting motion from one of gears 15 and 16 to the other thereof. The ratio of gears 15 and 16 is the same as the ratio of the number of segments of rotatable member 12 to the number of the lobes of cam 10, so that for each passing segment 14 of rotatable member 12, one lobe of cam 10 is presented for engagement with one of the rolls of movable member 2.

Rolls 8 and 9 are urged to engagement with cam 10 by tension spring 19.

For purposes of adjustment, I preferably mount pivot 5 of arm 4 on eccentric stud 20, whereby if stud 20 is rotated, the position of pin 5 will be changed relatively to the positions of shafts 11 and 13, for instance.

The particular object of my improvements is to cause the outer end of portion 6 of movable member 2 to approach rotatable member 12, to then advance in coaction with one of the segments 14 thereof, and to then retreat from said rotatable member; and thereafter to repeat this operation in coaction with the next succeeding segment of said rotatable member, and so on.

The operation of my improved mechanical movement will be readily understood from the several figures of the drawing. In Fig. 1 the outer end of portion 6 of movable member 2 is at its farthest point relatively to the periphery of rotatable member 12, and as cam 10 is rotated in anti-clockwise direction it will force roll 8 outwardly and permit roll 9 to move downwardly, whereby outreaching portions 6 will move to the right and upwardly to the position of Fig. 2, for coaction with one of the segments of rotatable member 12, which is also traveling in anti-clockwise direction. As cam 10 passes from the position of Fig. 2 to that of Fig. 3, outreaching portion 6 will be caused to lower slightly into engagement with the contiguous segment 14 and to then move downwardly in coacting engagement therewith. As cam 10 passes from the position of Fig. 3 back to that of Fig. 1, outreaching portion 6 will retreat from said rotatable member 12 and be in position to repeat the operation in coaction with the next succeeding segment 14 of said rotatable member.

The mechanical movement of this application is adapted, among other uses, for causing the platen of a printing machine to coact with successive type sections on a cylinder; outreaching portion 6 representing the platen and sections 14, 14, representing the successive portions of type matter. The paper to be printed upon will be inserted between outreaching portion 6 and rotatable member 12.

I claim:

1. A mechanical movement including in combination a rotatable member, a rotatable cam, means for rotating said rotatable member and said cam in predetermined relation and a movable member mounted for reciprocation and oscillation, said cam being efficient for synchronously reciprocating and oscillating said movable member in coaction with said rotatable member.

2. A mechanical movement including in combination a rotatable member, means for rotating said rotatable member, a movable member mounted for reciprocation and oscillation, and means for causing said movable member to approach and retreat relatively to said rotatable member and between its approaching and retreating movements to advance in coaction with said rotatable member.

3. A mechanical movement including in combination an oscillatable arm, a movable member pivoted at one point thereof in the free end of said arm and having a free end remote from said pivot, a rotatable member, a rotatable cam, means for rotating said rotatable member and said cam in predetermined relation, and two cam engaging members on said pivoted member for simultaneous engagement with different portions of the periphery of said cam whereby the free end of said pivoted member is caused to approach and retreat relatively to said rotatable member and between its approaching and retreating movements to advance in coaction with said rotatable member.

4. A mechanical movement including in combination an oscillatable arm, a movable member pivoted at one point thereof in the free end of said arm and having a free end remote from said pivot, a rotatable member, a rotatable cam, means for rotating said rotatable member and said cam in predetermined relation, two cam engaging members on said pivoted member for simultaneous engagement with different portions of the periphery of said cam whereby the free end of said pivoted member is caused to approach and retreat relatively to said rotatable member and between its approaching and retreating movements to advance in coaction with said rotatable member, and means for changing the location of the point of oscillation of said oscillatable arm.

5. A mechanical movement including in combination a rotatable member, a rotatable cam, means for rotating said rotatable member and said cam in predetermined relation, a movable member mounted for reciprocation and oscillation, means for synchronously reciprocating and oscillating said movable member from said cam in coaction with said rotatable member, and means for adjusting the position of said movable member relatively to said cam.

6. A mechanical movement including in combination a rotatable member, a rotatable cam, means for rotating said rotatable member and said cam in predetermined relation and a movable member interposed between said rotatable member and said cam, said cam being efficient for synchronously reciprocating and oscillating said movable member for causing said movable member to approach and retreat relatively to said rotatable member and between its approaching and retreating movements to advance in coaction with said rotatable member.

Signed at New York, in the county of New York and State of New York, this 3rd day of March, 1914, before two subscribing witnesses.

FRANK DE MINICO.

Witnesses:
LEONARD W. HALE,
WILLIAM U. STRETCH.

Copies of this patent may be obtained for five cents each, by addressing the "Commissioner of Patents, Washington, D. C."